(12) United States Patent
Liu et al.

(10) Patent No.: US 12,489,595 B2
(45) Date of Patent: Dec. 2, 2025

(54) APERIODIC SRS TRIGGERING AND TRANSMISSION

(71) Applicant: Lenovo (Beijing) Ltd., Beijing (CN)

(72) Inventors: Bingchao Liu, Changping District (CN); Chenxi Zhu, Haidian District (CN); Yi Zhang, Chao Yang District (CN); Wei Ling, Changping (CN)

(73) Assignee: Lenovo (Beijing) Ltd., Beijing (CN)

( * ) Notice: Subject to any disclaimer, the term of this patent is extended or adjusted under 35 U.S.C. 154(b) by 303 days.

(21) Appl. No.: 17/793,558

(22) PCT Filed: Feb. 14, 2020

(86) PCT No.: PCT/CN2020/075246
§ 371 (c)(1),
(2) Date: Jul. 18, 2022

(87) PCT Pub. No.: WO2021/159459
PCT Pub. Date: Aug. 19, 2021

(65) Prior Publication Data
US 2023/0049134 A1 Feb. 16, 2023

(51) Int. Cl.
*H04L 5/00* (2006.01)

(52) U.S. Cl.
CPC ............ *H04L 5/0098* (2013.01); *H04L 5/001* (2013.01); *H04L 5/0048* (2013.01); *H04L 5/0087* (2013.01)

(58) Field of Classification Search
CPC ..... H04L 5/0098; H04L 5/001; H04L 5/0048; H04L 5/0087
See application file for complete search history.

(56) References Cited

U.S. PATENT DOCUMENTS

2013/0155868 A1\* 6/2013 Seo .................... H03M 13/3723
370/241
2017/0302419 A1  10/2017 Liu et al.
(Continued)

FOREIGN PATENT DOCUMENTS

| CN | 107113787 A   | 8/2017  |
|----|---------------|---------|
| CN | 107148789 A   | 9/2017  |
| WO | 2019216750 A1 | 11/2019 |

OTHER PUBLICATIONS

Mediatek Inc. , "Discussion on CSI-RS configuration update for CQI reporting and active spatial relation switch", 3GPP TSG-RAN WG4 Meeting #93, R4-1913316, Reno, Nevada [retrieved Aug. 22, 2022] Retrieved from the internet <https://www.3gpp.org/ftp/tsg_ran/WG4_Radio/TSGR4_93/Docs>., Nov. 2019, 8 Pages.
(Continued)

Primary Examiner — Kevin M Cunningham
(74) Attorney, Agent, or Firm — FIG. 1 Patents

(57) ABSTRACT

Methods and apparatuses for associating aperiodic SRS triggering state(s) with SRS resource sets or SRS CC sets are disclosed. A method comprises transmitting an Activation/Deactivation MAC CE to indicate or update the association between aperiodic SRS triggering state(s) and the aperiodic SRS resource set(s) for the SRS request field value carried by DCI format 0_1 or 1_1 or DCI format 2_3 with a higher layer parameter srs-TPC-PDCCH-Group=typeB or the SRS CC set(s) for the SRS request field value carried by DCI format 2_3 with the higher layer parameter srs-TPC-PDCCH-Group=typeA.

20 Claims, 13 Drawing Sheets

(56) References Cited

U.S. PATENT DOCUMENTS

| | | | |
|---|---|---|---|
| 2018/0191483 A1 | 7/2018 | Yamazaki et al. | |
| 2019/0103954 A1* | 4/2019 | Lee | H04L 5/0098 |
| 2019/0174466 A1 | 6/2019 | Zhang et al. | |
| 2019/0199497 A1 | 6/2019 | Park et al. | |
| 2020/0204406 A1* | 6/2020 | Zhang | H04B 7/0456 |
| 2021/0126816 A1* | 4/2021 | Davydov | H04L 5/0091 |
| 2021/0144716 A1 | 5/2021 | Choi et al. | |
| 2021/0195565 A1* | 6/2021 | Venugopal | H04L 5/0096 |
| 2022/0173848 A1* | 6/2022 | Guan | H04B 7/0695 |
| 2023/0379108 A1* | 11/2023 | Grossmann | H04L 5/0053 |

OTHER PUBLICATIONS

PCT/CN2020/075246, "International Preliminary Report on Patentability", PCT Application No. PCT/CN2020/075246, Aug. 25, 2022, 5 pages.

PCT/CN2020/075246, "International Search Report and Written Opinion", PCT Application No. PCT/CN2020/075246, Oct. 26, 2020, 6 pages.

20918385.4, "Extended European Search Report", EP Application No. 20918385.4, Oct. 10, 2023, 12 pages.

Huawei, et al., "MAC CE signalling for multi-beam enhancement", 3GPP TSG-RAN WG2 Meeting#108, R2-1914676, Reno, USA [retrieved Oct. 16, 2023]. Retrieved from the Internet <https://www.3gpp.org/ftp/tsg_ran/WG2_RL2/TSGR2_108/Docs>, Nov. 2019, 13 pages.

OPPO, "MAC CE design for eMIMO", 3GPP TSG-RAN WG2 Meeting #108, R2-1915158, Reno, USA [retrieved Dec. 30, 2023]. Retrieved from the Internet <https://www.3gpp.org/ftp/tsg_ran/WG2_RL2/TSGR2_108/Docs?sortby=sizerev>, Nov. 2019, 6 pages.

"Foreign Office Action", CN Application No. 202080096502.2, Nov. 28, 2024, 13 pages.

* cited by examiner

| | | | | | | | |
|---|---|---|---|---|---|---|---|

| R | Serving cell ID | | | | | BWP ID | | Oct 1 |
|---|---|---|---|---|---|---|---|---|
| R | R | R | R | R | R | aperiodicSRS-ResourceTrigger ID | | Oct 2 |
| $S_7$ | $S_6$ | $S_5$ | $S_4$ | $S_3$ | $S_2$ | $S_1$ | $S_0$ | Oct 3 |
| $S_{15}$ | $S_{14}$ | $S_{13}$ | $S_{12}$ | $S_{11}$ | $S_{10}$ | $S_9$ | $S_8$ | Oct 4 |
| ... | | | | | | | | |
| $S_{(N-2)\times 8+7}$ | $S_{(N-2)\times 8+6}$ | $S_{(N-2)\times 8+5}$ | $S_{(N-2)\times 8+4}$ | $S_{(N-2)\times 8+3}$ | $S_{(N-2)\times 8+2}$ | $S_{(N-2)\times 8+1}$ | $S_{(N-2)\times 8}$ | Oct N+1 |

Figure 1

| R | Serving cell ID | | | | | BWP ID | |
|---|---|---|---|---|---|---|---|
| R | R | R | R | aperiodicSRS-ResourceTrigger ID2 | | aperiodicSRS-ResourceTrigger ID1 | |
| $S1_7$ | $S1_6$ | $S1_5$ | $S1_4$ | $S1_3$ | $S1_2$ | $S1_1$ | $S1_0$ |
| $S1_{15}$ | $S1_{14}$ | $S1_{13}$ | $S1_{12}$ | $S1_{11}$ | $S1_{10}$ | $S1_9$ | $S1_8$ |

...

| $S1_{(N-2)\times8+7}$ | $S1_{(N-2)\times8+6}$ | $S1_{(N-2)\times8+5}$ | $S1_{(N-2)\times8+4}$ | $S1_{(N-2)\times8+3}$ | $S1_{(N-2)\times8+2}$ | $S1_{(N-2)\times8+1}$ | $S1_{(N-2)\times8}$ |
| $S2_7$ | $S2_6$ | $S2_5$ | $S2_4$ | $S2_3$ | $S2_2$ | $S2_1$ | $S2_0$ |
| $S2_{15}$ | $S2_{14}$ | $S2_{13}$ | $S2_{12}$ | $S2_{11}$ | $S2_{10}$ | $S2_9$ | $S2_8$ |

...

| $S2_{(N-2)\times8+7}$ | $S2_{(N-2)\times8+6}$ | $S2_{(N-2)\times8+5}$ | $S2_{(N-2)\times8+4}$ | $S2_{(N-2)\times8+3}$ | $S2_{(N-2)\times8+2}$ | $S2_{(N-2)\times8+1}$ | $S2_{(N-2)\times8}$ |

Figure 3-1

| R | Serving cell ID | | | | | BWP ID | |
|---|---|---|---|---|---|---|---|
| $S1_7$ | $S1_6$ | $S1_5$ | $S1_4$ | $S1_3$ | $S1_2$ | $S1_1$ | $S1_0$ |
| $S1_{15}$ | $S1_{14}$ | $S1_{13}$ | $S1_{12}$ | $S1_{11}$ | $S1_{10}$ | $S1_9$ | $S1_8$ |

...

| $S1_{(N-2)\times 8+7}$ | $S1_{(N-2)\times 8+6}$ | $S1_{(N-2)\times 8+5}$ | $S1_{(N-2)\times 8+4}$ | $S1_{(N-2)\times 8+3}$ | $S1_{(N-2)\times 8+2}$ | $S1_{(N-2)\times 8+1}$ | $S1_{(N-2)\times 8}$ |
| $S2_7$ | $S2_6$ | $S2_5$ | $S2_4$ | $S2_3$ | $S2_2$ | $S2_1$ | $S2_0$ |
| $S2_{15}$ | $S2_{14}$ | $S2_{13}$ | $S2_{12}$ | $S2_{11}$ | $S2_{10}$ | $S2_9$ | $S2_8$ |

...

| $S2_{(N-2)\times 8+7}$ | $S2_{(N-2)\times 8+6}$ | $S2_{(N-2)\times 8+5}$ | $S2_{(N-2)\times 8+4}$ | $S2_{(N-2)\times 8+3}$ | $S2_{(N-2)\times 8+2}$ | $S2_{(N-2)\times 8+1}$ | $S2_{(N-2)\times 8}$ |
| $S3_7$ | $S3_6$ | $S3_5$ | $S3_4$ | $S3_3$ | $S3_2$ | $S3_1$ | $S3_0$ |
| $S3_{15}$ | $S3_{14}$ | $S3_{13}$ | $S3_{12}$ | $S3_{11}$ | $S3_{10}$ | $S3_9$ | $S3_8$ |

...

| $S3_{(N-2)\times 8+7}$ | $S3_{(N-2)\times 8+6}$ | $S3_{(N-2)\times 8+5}$ | $S3_{(N-2)\times 8+4}$ | $S3_{(N-2)\times 8+3}$ | $S3_{(N-2)\times 8+2}$ | $S3_{(N-2)\times 8+1}$ | $S3_{(N-2)\times 8}$ |

Figure 3-2

| R | Serving cell ID | | BWP ID | Oct 1 |
|---|---|---|---|---|
| R | R | CC set ID associated with SRS request field =11 | CC set ID associated with SRS request field =10 | CC set ID associated with SRS request field =01 | Oct 2 |

Figure 5-1

| R | Serving cell ID | | | | | BWP ID | | Oct 1 |
|---|---|---|---|---|---|---|---|---|
| $S1_7$ | $S1_6$ | $S1_5$ | $S1_4$ | $S1_3$ | $S1_2$ | $S1_1$ | $S1_0$ | Oct 2 |
| $S2_7$ | $S2_6$ | $S2_5$ | $S2_4$ | $S2_3$ | $S2_2$ | $S2_1$ | $S2_0$ | Oct 3 |
| $S3_7$ | $S3_6$ | $S3_5$ | $S3_4$ | $S3_3$ | $S3_2$ | $S3_1$ | $S3_0$ | Oct 4 |

Figure 6

| C | Serving cell ID | | | | | BWP ID | | Oct 1 |
|---|---|---|---|---|---|---|---|---|
| $S1_7$ | $S1_6$ | $S1_5$ | $S1_4$ | $S1_3$ | $S1_2$ | $S1_1$ | $S1_0$ | Oct 2 |
| $S2_7$ | $S2_6$ | $S2_5$ | $S2_4$ | $S2_3$ | $S2_2$ | $S2_1$ | $S2_0$ | Oct 3 |
| $S3_7$ | $S3_6$ | $S3_5$ | $S3_4$ | $S3_3$ | $S3_2$ | $S3_1$ | $S3_0$ | Oct 4 |

Figure 7

| C | Serving cell ID | | | | | BWP ID | | Oct 1 |
|---|---|---|---|---|---|---|---|---|
| R | R | R | R | R | R | aperiodicSRS-ResourceTrigger ID | | Oct 2 |
| $S_7$ | $S_6$ | $S_5$ | $S_4$ | $S_3$ | $S_2$ | $S_1$ | $S_0$ | Oct 3 |
| $S_{15}$ | $S_{14}$ | $S_{13}$ | $S_{12}$ | $S_{11}$ | $S_{10}$ | $S_9$ | $S_8$ | Oct 4 |
| ... | | | | | | | | |
| $S_{(N-2)\times 8+7}$ | $S_{(N-2)\times 8+6}$ | $S_{(N-2)\times 8+5}$ | $S_{(N-2)\times 8+4}$ | $S_{(N-2)\times 8+3}$ | $S_{(N-2)\times 8+2}$ | $S_{(N-2)\times 8+1}$ | $S_{(N-2)\times 8}$ | Oct N+1 |

Figure 8

APERIODIC SRS TRIGGERING AND TRANSMISSION

FIELD

The subject matter disclosed herein generally relates to wireless communications, and more particularly relates to methods and apparatuses for aperiodic SRS triggering and transmission.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM), Radio Resource Control (RRC), Time-Division Duplex (TDD), Time Division Multiplex (TDM), User Entity/Equipment (Mobile Terminal) (UE), Uplink (UL), Universal Mobile Telecommunications System (UMTS), Physical Downlink Shared Channel (PDSCH), Physical Uplink Shared Channel (PUSCH), Physical Uplink Control Channel (PUCCH), Downlink control information (DCI), single DCI (S-DCI), transmission reception point (TRP), multiple TRP (multi-TRP or M-TRP), frequency range 2 (FR2), Quasi Co-Location (QCL), channel state information reference signal (CSI-RS), CSI-RS Resource Indicator (CRI), Code Division Multiplexing (CDM), Transmission Configuration Indication (TCI), Sounding Reference Signal (SRS), Control Resource Set (CORESET), Synchronization Signal (SS), reference signal (RS), component carrier (CC), Bandwidth Part (BWP).

In Release 16, up to 16 SRS resource sets can be configured for a UE in a BWP according to UE capability with usage of 'beam management', 'codebook', 'non-codebook' and 'antenna switching'. SRS resource for all usages can be transmitted with aperiodic time domain behavior. Aperiodic SRS for 'beam management', 'codebook', 'non-codebook' and 'antenna switching' can be triggered by DCI format 0_1 and 1_1 with non-zero 'SRS request' field. Carrier switching based aperiodic SRS transmission can be triggered by DCI format 2_3 with non-zero 'SRS request' field.

For aperiodic SRS triggered by DCI format 0_1 or 1_1 and DCI format 2_3 with higher layer parameter SRS-TPC-PDCCH-Group sets to 'type B', each value of 'SRS request' field in DCI format 0_1 or 1_1 or 2_3 is associated with one or more SRS resource sets configured by RRC signaling. For carrier switching based aperiodic SRS transmission triggered by DCI format 2_3 with higher layer parameter SRS-TPC-PDCCH-Group sets to 'type A', each value of 'SRS request' field in DCI format 2_3 is associated with a set of CCs for SRS transmission by RRC signaling. Therefore, the update of the association between aperiodic SRS triggering state(s), i.e. SRS request field value(s), and SRS resource sets or the association between aperiodic SRS triggering state(s), i.e. SRS request field value(s), and the SRS CC sets can only be achieved through RRC signaling, which has larger latency and is inefficient.

In addition, for aperiodic SRS transmission for carrier switching, if higher layer parameter srs-TPC-PDCCH-Group=typeA, each aperiodic SRS triggering state can trigger multiple SRS transmissions on multiple CCs configured by higher layer parameter SRS-CC-Set. Up to 4 SRS CC sets can be configured by RRC for one UE. In DCI format 2_3, the first SRS CC set is associated with SRS request field value='01', the second SRS CC set is associated with SRS request field value='10' and the third SRS CC set is associated with SRS request field value='11'. It can be seen that it is unknown with which SRS request field value the fourth SRS CC set is associated.

This disclosure targets a new way of updating the association between the SRS request field value and the triggered SRS transmission with lower latency.

BRIEF SUMMARY

Methods and apparatuses for associating aperiodic SRS triggering state(s) with SRS resource sets or SRS CC sets are disclosed.

In one embodiment, a method comprises transmitting an Activation/Deactivation MAC CE to indicate or update the association between aperiodic SRS triggering state(s) and the aperiodic SRS resource set(s) for the SRS request field value carried by DCI format 0_1 or 1_1 or DCI format 2_3 with higher layer parameter srs-TPC-PDCCH-Group=typeB or the SRS CC set(s) for the SRS request field value carried by DCI format 2_3 with higher layer parameter srs-TPC-PDCCH-Group=typeA.

In one embodiment, the Activation/Deactivation MAC CE is an Aperiodic SRS Resource Set Activation/Deactivation MAC CE to indicate or update the association between aperiodic SRS triggering state(s) and the aperiodic SRS resource set(s) for the SRS request field value carried by DCI format 0_1 or 1_1 or DCI format 2_3 with higher layer parameter srs-TPC-PDCCH-Group=typeB. One or more aperiodic SRS triggering states and the associated aperiodic SRS resource set(s) are indicated in the Aperiodic SRS Resource Set Activation/Deactivation MAC CE. In one solution, one or more aperiodic SRS triggering state ID fields are contained in the Aperiodic SRS Resource Set Activation/Deactivation MAC CE to indicate which aperiodic SRS triggering state(s) the Aperiodic SRS Resource Set Activation/Deactivation MAC CE applies, and the activation status of all configured aperiodic SRS resource sets for each aperiodic SRS triggering state are indicated by a bitmap. In another solution, one or more aperiodic SRS resource set ID fields are contained in the Aperiodic SRS Resource Set Activation/Deactivation MAC CE to indicate which aperiodic SRS resource set(s) the Aperiodic SRS Resource Set Activation/Deactivation MAC CE applies, and the associated aperiodic SRS triggering states for each SRS resource set are indicated by a 3-bits bitmap, and each bit of the 3-bits bitmap indicates the activate status of each associated aperiodic SRS triggering state for the aperiodic SRS resource set indicated by the SRS resource set ID field.

In another embodiment, the Activation/Deactivation MAC CE is an SRS CC Set Activation/Deactivation MAC CE to indicate or update the association between aperiodic SRS triggering state(s) and the SRS CC set(s) for the SRS request field value carried by DCI format 2_3 with higher layer parameter srs-TPC-PDCCH-Group=typeA. More than four SRS CC sets can be configured for a UE according to UE capability. In one solution, one or more SRS CC set ID fields are contained in the SRS CC Set Activation/Deactivation MAC CE to indicate the activated SRS CC set for each aperiodic SRS triggering state. In another solution, the activation statuses of all configured SRS CC sets for each aperiodic SRS triggering state are listed as a bitmap, and one or more SRS CC sets are activated for one aperiodic SRS triggering state.

In some embodiment, the Aperiodic SRS Resource Set Activation/Deactivation MAC CE is associated with a higher layer parameter CORESETPoolIndex configured for CORESET which is configured for CORESET.

In some embodiment, the SRS CC Set Activation/Deactivation MAC CE is associated with a higher layer parameter CORESETPoolIndex configured for CORESET which is configured for CORESET.

In one embodiment, a method comprises receiving an Activation/Deactivation MAC CE to indicate or update the association between aperiodic SRS triggering state(s) and the aperiodic SRS resource set(s) for the SRS request field value carried by DCI format 0_1 or 1_1 or DCI format 2_3 with higher layer parameter srs-TPC-PDCCH-Group=typeB or the SRS CC set(s) for the SRS request field value carried by DCI format 2_3 with higher layer parameter srs-TPC-PDCCH-Group=typeA.

In another embodiment, a remote unit comprises a receiver that is configured to receiving an Activation/Deactivation MAC CE to indicate or update the association between aperiodic SRS triggering state(s) and the aperiodic SRS resource set(s) for the SRS request field value carried by DCI format 0_1 or 1_1 or DCI format 2_3 with higher layer parameter srs-TPC-PDCCH-Group=typeB or the SRS CC set(s) for the SRS request field value carried by DCI format 2_3 with higher layer parameter srs-TPC-PDCCH-Group=typeA.

In yet another embodiment, a base unit comprises a transmitter that is configured to transmit an Activation/Deactivation MAC CE to indicate or update the association between aperiodic SRS triggering state(s) and the aperiodic SRS resource set(s) for the SRS request field value carried by DCI format 0_1 or 1_1 or DCI format 2_3 with higher layer parameter srs-TPC-PDCCH-Group=typeB or the SRS CC set(s) for the SRS request field value carried by DCI format 2_3 with higher layer parameter srs-TPC-PDCCH-Group=typeA.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which:

FIG. 1 illustrates an Aperiodic SRS Resource Set Activation/Deactivation MAC CE according to a first embodiment;

FIGS. 3-1 and 3-2 illustrate Aperiodic SRS Resource Set Activation/Deactivation MAC CEs according to a third embodiment;

FIGS. 5-1 and 5-2 illustrate SRS CC Set Activation/Deactivation MAC CEs according to a fifth embodiment;

FIG. 6 illustrates an Aperiodic SRS Resource Set Activation/Deactivation MAC CE according to a sixth embodiment;

FIG. 7 illustrates an example of the SRS CC Set Activation/Deactivation MAC CE according to a seventh embodiment;

FIG. 8 illustrates an example of the Aperiodic SRS Resource Set Activation/Deactivation MAC CE according to the seventh embodiment;

DETAILED DESCRIPTION

Figure 2:
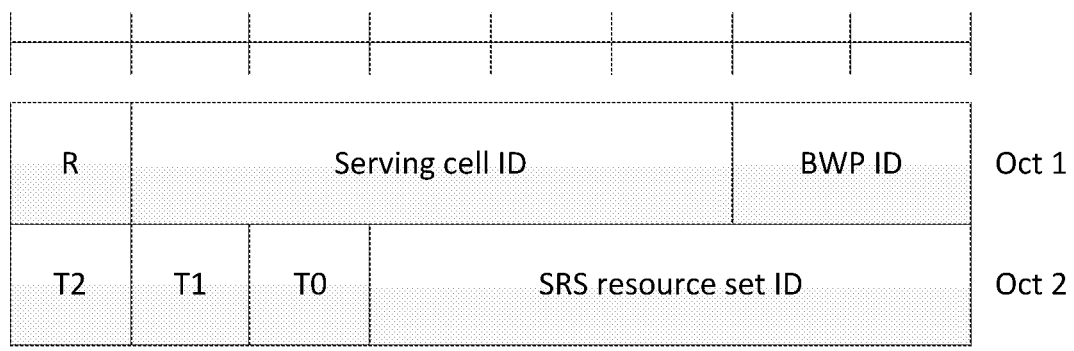
FIG. 2 illustrates an Aperiodic SRS Resource Set Activation/Deactivation MAC CE according to a second embodiment.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

In NR Release 17, more than one SRS resource set may be configured for a UE in a BWP with the usage of 'codebook' and/or 'non-codebook' for multi-panel based UL transmission. More than two SRS resource sets may be configured for a UE in a BWP for antenna switching with up to 8 Rx antenna ports. The maximum number of configured SRS resource sets for a UE in a BWP is 16 in NR Release 16 according to UE capability. Considering the potential use case of multi-DCI based multi-TRP UL transmission and SRS for antenna switching with up to 8 Rx antenna ports, more than 16 SRS resource sets can be configured for a UE in a BWP according to UE capability.

Each aperiodic SRS resource set can be associated with an aperiodic SRS triggering state by the higher layer parameter aperiodicSRS-ResourceTrigger, or be associated with multiple aperiodic SRS triggering states by the higher layer parameter aperidicSRS-ResourceTriggerList.

According to the present application, an Aperiodic SRS Resource Set Activation/Deactivation MAC CE is used to indicate or update the association between aperiodic SRS triggering states and the SRS resource set(s) for the aperiodic SRS triggered by a non-zero SRS request field value carried by DCI format 0_1 or 1_1 or DCI format 2_3 with the higher layer parameter srs-TPC-PDCCH-Group=typeB, and a SRS CC set Activation/Deactivation MAC CE is used to indicate or update the association between aperiodic SRS triggering states and the SRS CC set(s) for the aperiodic SRS triggered by a non-zero SRS request field value carried by DCI format 2_3 with the higher layer parameter srs-TPC-PDCCH-Group=typeA.

According to the first embodiment, for aperiodic SRS triggered by DCI format 0_1 or 1_1 or by DCI format 2_3 with the higher layer parameter srs-TPC-PDCCH-Group=typeB, the gNB can send an Aperiodic SRS Resource Set Activation/Deactivation MAC CE with the format provided in FIG. 1. One or more SRS resource sets can be activated or deactivated for (i.e. associated or de-associated with) one aperiodic SRS triggering state indicated in the MAC CE on a BWP.

The Aperiodic SRS Resource Set Activation/Deactivation MAC CE according to the first embodiment is identified by a MAC subheader with a dedicated LCID. As shown in FIG. 1, the Aperiodic SRS Resource Set Activation/Deactivation MAC CE according to the first embodiment has the following fields:

Serving Cell ID: This field indicates the identity of the Serving Cell for which the MAC CE applies. The length of the field is 5 bits.

BWP ID: This field indicates a DL BWP for which the MAC CE applies as the codepoint of the DCI or UL bandwidth part indicator field as specified in TS 38.212 [9]. The length of the BWP ID field is 2 bits.

aperiodicSRS-ResourceTrigger ID: This field indicates an aperiodic SRS resource triggering state for which the MAC CE applies. The length of the aperiodicSRS-ResourceTrigger ID field is 2 bits as one of three aperiodic SRS resource triggering states is triggered.

$S_i$: If one or more aperiodic SRS resource sets are configured for a UE in the indicated BWP, this field indicates the activation or deactivation (i.e. association or de-association) status of the aperiodic SRS resource set with SRS-ResourceSetId i. The Si field is set to 1 to indicate that the SRS resource set with SRS-ResourceSetId i shall be activated for, i.e. associated with the SRS request field value indicated by the aperiodicSRS-ResourceTrigger ID field. The Si field is set to 0 to indicate that the SRS resource set with SRS-ResourceSetId i shall be deactivated from, i.e., de-associated with the SRS request field value indicated by the aperiodicSRS-ResourceTrigger ID field. One or more SRS resource sets can be activated or deactivated for (i.e. associated or de-associated with) one aperiodic SRS resource triggering state.

R: Reserved bit, set to 0.

According to the first embodiment, the SRS request field value indicated by the aperiodicSRS-ResourceTrigger ID is associated with each of SRS resource sets represented by $S_i$ field that is set to 1, and de-associated with each of SRS resource sets represented by $S_i$ field that is set to 0.

For example, suppose 16 SRS resource sets are configured for the UE in the BWP (indicated by BWP ID), $S_0$ to $S_{15}$ represent 16 SRS resource sets, respectively. If $S_n$ is set to 1 (n is any of 0 to 15), the $(n+1)^{th}$ SRS resource set represented by $S_n$ is associated with the SRS request field value indicated by the aperiodicSRS-ResourceTrigger ID. On the other hand, if $S_n$ is set to 0 (n is any of 0 to 15), the $(n+1)^{th}$ SRS resource set represented by $S_n$ is de-associated with the SRS request field value indicated by the aperiodicSRS-ResourceTrigger ID.

The length of the Aperiodic SRS Resource Set Activation/Deactivation MAC CE according to the first embodiment is dependent on the number of SRS resource sets configured for the UE in the BWP. When the number of SRS resource sets configured for the UE in the BWP is 16, the length of the Aperiodic SRS Resource Set Activation/Deactivation MAC CE is 32 bits (i.e. 4 octets). When the number of SRS resource sets configured for the UE in the BWP is 8X (X is a positive integer), the length of the Aperiodic SRS Resource Set Activation/Deactivation MAC CE is X+2 octets (N indicated in FIG. 1 is equal to X+1).

According to the second embodiment, for aperiodic SRS triggered by DCI format 0_1 or 1_1 or DCI format 2_3 with the higher layer parameter srs-TPC-PDCCH-Group=typeB, the gNB can send an Aperiodic SRS Resource Set Activation/Deactivation MAC CE with the format provided in FIG. 2. One SRS resource set can be associated with one or more (up to 3) aperiodic SRS resource triggering states.

The Aperiodic SRS Resource Set Activation/Deactivation MAC CE according to the second embodiment is identified by a MAC subheader with a dedicated LCID. As shown in FIG. 2, the Aperiodic SRS Resource Set Activation/Deactivation MAC CE according to the second embodiment has the following fields:

Serving Cell ID: This field indicates the identity of the Serving Cell for which the MAC CE applies. The length of the field is 5 bits.

BWP ID: This field indicates a DL BWP for which the MAC CE applies as the codepoint of the DCI or UL bandwidth part indicator field as specified in TS 38.212 [9]. The length of the BWP ID field is 2 bits.

SRS resource set ID: If one or more aperiodic SRS resource sets are configured for the UE in a BWP, this field indicates one aperiodic SRS resource set for which the MAC CE applies. The length of the field may be 5 bits if up to 32 SRS resource sets can be configured for the UE in a BWP or 4 bits if up to 16 SRS resource sets can be configured for a UE in a BWP.

Ti: This field indicates the activation or deactivation status of the $(i+1)^{th}$ aperiodic SRS triggering state associated with the SRS resource set indicated by the SRS resource set ID field.

R: Reserved bit, set to 0.

According to the second embodiment, the SRS resource set indicated by the SRS resource set ID field is associated or de-associated with the $(i+1)^{th}$ aperiodic SRS resource triggering states represented by Ti (i=0, 1, 2). Ti (i=0, 1, 2) is set to 1, which means association, or is set to 0, which means de-association.

For example, if T0, T1 and T2 are set to 1, 0 and 1, the SRS resource set indicated by the SRS resource set ID field is associated with the first and the third aperiodic SRS resource triggering states and de-associated with the second aperiodic SRS resource triggering state.

The length of the Aperiodic SRS Resource Set Activation/Deactivation MAC CE according to the second embodiment is fixed as 16 bits (i.e. 2 octets).

The first embodiment is related to associating or de-associating a single aperiodic SRS triggering state with all of the configured aperiodic SRS resource set(s) by using one Aperiodic SRS Resource Set Activation/Deactivation MAC CE according to the first embodiment.

According to the third embodiment, two or all three aperiodic SRS triggering states are associated or de-associated with all of the configured aperiodic SRS resource set(s) by using one Aperiodic SRS Resource Set Activation/Deactivation MAC CE according to the third embodiment.

According to the third embodiment, for aperiodic SRS triggered by DCI format 0_1 or 1_1 or by DCI format 2_3 with the higher layer parameter srs-TPC-PDCCH-Group=typeB, the gNB can send an Aperiodic SRS Resource Set Activation/Deactivation MAC CE with the format provided in FIG. 3-1 or 3-2.

One or more aperiodic SRS resource sets can be associated or de-associated with two aperiodic SRS triggering states on a BWP based on the Aperiodic SRS Resource Set Activation/Deactivation MAC CE shown in FIG. 3-1.

The Aperiodic SRS Resource Set Activation/Deactivation MAC CE shown in FIG. 3-1 is identified by a MAC subheader with a dedicated LCID. As shown in FIG. 3-1, the Aperiodic SRS Resource Set Activation/Deactivation MAC CE has the following fields:

Serving Cell ID: This field indicates the identity of the Serving Cell for which the MAC CE applies. The length of the field is 5 bits.

BWP ID: This field indicates a DL BWP for which the MAC CE applies as the codepoint of the DCI or UL bandwidth part indicator field as specified in TS 38.212 [9]. The length of the BWP ID field is 2 bits.

aperiodicSRS-ResourceTrigger ID1 and aperiodicSRS-ResourceTrigger ID2: This field indicates two aperiodic SRS resource triggering states for which the MAC CE applies. The length of each of the aperiodicSRS-ResourceTrigger ID1 and the aperiodicSRS-ResourceTrigger ID2 is 2 bits as one of three aperiodic SRS resource triggering states is triggered.

$S1_i$ and $S2_i$: If one or more aperiodic SRS resource sets are configured for a UE in the indicated BWP, $S1_i$ indicates the activation or deactivation status of the SRS resource set with SRS-ResourceSetId i associated with the SRS request field value indicated by the aperiodicSRS-ResourceTrigger ID1; and $S2_i$ indicates the activation or deactivation status of the SRS resource set with SRS-ResourceSetId i associated with the SRS request field value indicated by the aperiodicSRS-ResourceTrigger ID2. The $S1_i$ (or $S2_i$) is set to 1 to indicate that the aperiodic SRS resource set with SRS-ResourceSetId i shall be associated with the aperiodic SRS resource triggering state indicated by aperiodicSRS-ResourceTrigger ID1 (or aperiodicSRS-ResourceTrigger ID2). The $S1_i$ (or $S2_i$) is set to 0 to indicate that the aperiodic SRS resource set with SRS-ResourceSetId i shall be de-associated with the aperiodic SRS resource triggering state indicated by aperiodicSRS-ResourceTrigger ID1 (or aperiodicSRS-ResourceTrigger ID2).

R: Reserved bit, set to 0.

According to the Aperiodic SRS Resource Set Activation/Deactivation MAC CE shown in FIG. 3-1, the aperiodic SRS resource triggering state indicated by aperiodicSRS-ResourceTrigger ID1 is associated with each of aperiodic SRS resource sets represented by $S1_i$ field that is set to 1, and de-associated with each of aperiodic SRS resource sets represented by $SN_i$ field that is set to 0. Similarly, the aperiodic SRS resource triggering state indicated by aperiodicSRS-ResourceTrigger ID2 is associated with each of aperiodic SRS resource sets represented by $S2_i$ field that is set to 1, and de-associated with each of aperiodic SRS resource sets represented by $S2_i$ field that is set to 0.

For example, suppose 16 SRS resource sets are configured for the UE in the BWP (indicated by BWP ID), $S1_0$ to $S1_{15}$ represent 16 SRS resource sets, respectively. If $S1_i$ is set to 1 (i is any of 0 to 15), the $(i+1)^{th}$ SRS resource set represented by $S1_i$ is associated with the aperiodic SRS resource triggering state indicated by aperiodicSRS-ResourceTrigger ID1. If $S1_i$ is set to 0 (i is any of 0 to 15), the $(i+1)^{th}$ SRS resource set represented by $S1_i$ is de-associated with the aperiodic SRS resource triggering state indicated by aperiodicSRS-ResourceTrigger ID1. Similarly, $S2_0$ to $S2_{15}$ represent 16 SRS resource sets, respectively. If $S2_i$ is set to 1 (i is any of 0 to 15), the $(i+1)^{th}$ SRS resource set represented by $S2_i$ is associated with the aperiodic SRS resource triggering state indicated by aperiodicSRS-ResourceTrigger ID2. If $S2_i$ is set to 0 (i is any of 0 to 15), the $(i+1)^{th}$ SRS resource set represented by $S2_i$ is de-associated with the aperiodic SRS resource triggering state indicated by aperiodicSRS-ResourceTrigger ID2.

The length of the Aperiodic SRS Resource Set Activation/Deactivation MAC CE shown in FIG. 3-1 is dependent on the number of SRS resource sets configured for the UE in the BWP. When the number of SRS resource sets configured for the UE in the BWP is 16, the length of the Aperiodic SRS Resource Set Activation/Deactivation MAC CE shown in FIG. 3-1 is 48 bits (i.e. 6 octets). When the number of SRS resource sets configured for the UE in the BWP is 8X (X is a positive integer), the length of the Aperiodic SRS Resource Set Activation/Deactivation MAC CE shown in FIG. 3-1 is 2X+2 octets (N indicated in FIG. 3-1 is equal to X+1)

One or more aperiodic SRS resource sets can be associated or de-associated with all three aperiodic SRS triggering states on a BWP based on the Aperiodic SRS Resource Set Activation/Deactivation MAC CE shown in FIG. 3-2.

The Aperiodic SRS Resource Set Activation/Deactivation MAC CE shown in FIG. 3-2 is identified by a MAC subheader with a dedicated LCID. As shown in FIG. 3-2, the Aperiodic SRS Resource Set Activation/Deactivation MAC CE has the following fields:

Serving Cell ID: This field indicates the identity of the Serving Cell for which the MAC CE applies. The length of the field is 5 bits.

BWP ID: This field indicates a DL BWP for which the MAC CE applies as the codepoint of the DCI or UL bandwidth part indicator field as specified in TS 38.212 [9]. The length of the BWP ID field is 2 bits.

$SN_i$: If one or more aperiodic SRS resource sets are configured for a UE in the indicated BWP, this field indicates the activation or deactivation status of the aperiodic SRS resource set with SRS-ResourceSetId i associated with the SRS request field value of N. The $SN_i$ field is set to 1 to indicate that the aperiodic SRS resource set with SRS-ResourceSetId i shall be associated with the $N^{th}$ aperiodic SRS resource triggering state. The $SN_i$ field is set to 0 to indicate that the aperiodic SRS resource set with SRS-ResourceSetId i shall be de-associated with the $N^{th}$ aperiodic SRS resource triggering state.

R: Reserved bit, set to 0.

According to the Aperiodic SRS Resource Set Activation/Deactivation MAC CE shown in FIG. 3-2, the $N^{th}$ aperiodic SRS resource triggering state is associated with each of aperiodic SRS resource sets represented by $SN_i$ field that is set to 1, and de-associated with each of aperiodic SRS resource sets represented by $SN_i$ field that is set to 0.

As each SRS resource set is indicated three times ($S1_i$, $S2_i$ and $S3_i$) for all three aperiodic SRS resource triggering states, it is unnecessary to contain any aperiodicSRS-ResourceTrigger ID field in the Aperiodic SRS Resource Set Activation/Deactivation MAC CE shown in FIG. 3-2.

For example, suppose 16 SRS resource sets are configured for the UE in the BWP (indicated by BWP ID), $SN_0$ to $SN_{15}$ represent 16 SRS resource sets (N=1, 2 and 3), respectively. If $SN_i$ is set to 1 (N=1, 2 or 3; i is any of 0 to 15), the $(i+1)^{th}$ SRS resource set represented by $SN_i$ is associated with the $N^{th}$ aperiodic SRS resource triggering state. On the other hand, if $SN_i$ is set to 0 (N=1, 2 or 3; i is any of 0 to 15), the $(i+1)^{th}$ SRS resource set represented by $SN_i$ is de-associated with the $N^{th}$ aperiodic SRS resource triggering state.

The length of the Aperiodic SRS Resource Set Activation/Deactivation MAC CE according to the third embodiment is dependent on the number of SRS resource sets configured for the UE in the BWP. When the number of SRS resource sets configured for the UE in the BWP is 16, the length of the Aperiodic SRS Resource Set Activation/Deactivation MAC CE according to the third embodiment is 56 bits (i.e. 7 octets). When the number of SRS resource sets configured for the UE in the BWP is 8X (X is a positive integer), the length of the Aperiodic SRS Resource Set Activation/Deactivation MAC CE according to the third embodiment is 3X+1 octets (N indicated in FIG. 3-2 is equal to X+1).

The second embodiment is related to associating or de-associating one SRS resource set with three aperiodic SRS resource triggering states by using one Aperiodic SRS Resource Set Activation/Deactivation MAC CE according to the second embodiment.

According to the fourth embodiment, all of configured SRS resource sets are associated or de-associated with three aperiodic SRS resource triggering states by using one Aperiodic SRS Resource Set Activation/Deactivation MAC CE according to the fourth embodiment.

Figure 4:
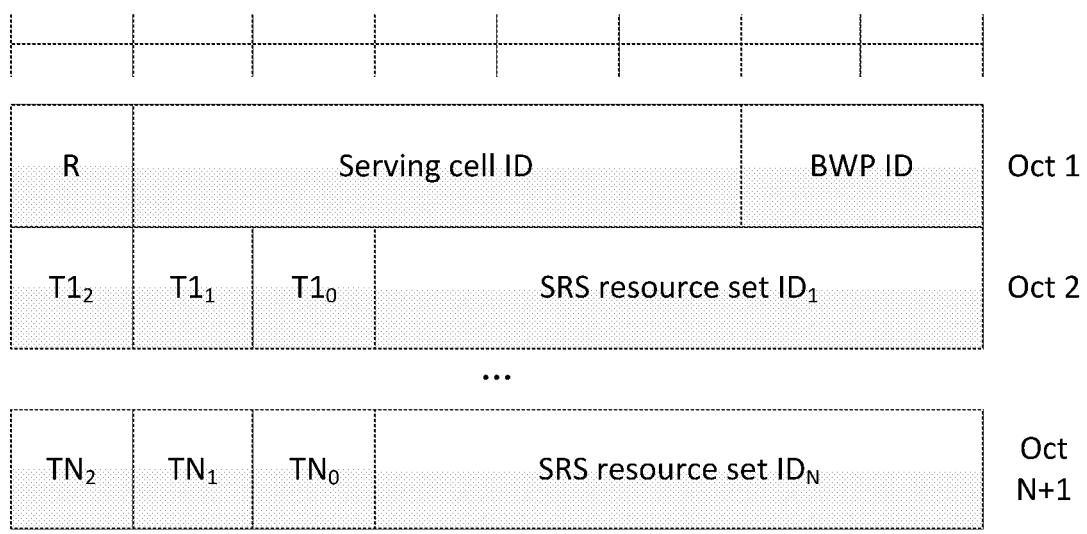
FIG. 4 illustrates an Aperiodic SRS Resource Set Activation/Deactivation MAC CE according to a fourth embodiment.

According to the fourth embodiment, for aperiodic SRS triggered by DCI format 0_1 or 1_1 or by DCI format 2_3 with the higher layer parameter srs-TPC-PDCCH-Group=typeB, the gNB can send an Aperiodic SRS Resource Set Activation/Deactivation MAC CE with the format provided in FIG. 4. All of configured aperiodic SRS resource sets can be associated with one or more (up to 3) aperiodic SRS resource triggering states.

The Aperiodic SRS Resource Set Activation/Deactivation MAC CE according to the fourth embodiment is identified by a MAC subheader with a dedicated LCID. As shown in FIG. 4, the Aperiodic SRS Resource Set Activation/Deactivation MAC CE according to the fourth embodiment has the following fields:

Serving Cell ID: This field indicates the identity of the Serving Cell for which the MAC CE applies. The length of the field is 5 bits.

BWP ID: This field indicates a DL BWP for which the MAC CE applies as the codepoint of the DCI or UL bandwidth part indicator field as specified in TS 38.212 [9]. The length of the BWP ID field is 2 bits.

SRS resource set $ID_N$: If one or more (up to N, N is a positive integer) aperiodic SRS resource sets are configured for the UE in a BWP, this field indicates the $N^{th}$ SRS resource set for which the MAC CE applies.

$TN_i$: This field indicates the activation or deactivation status of the $(i+1)^{th}$ aperiodic SRS triggering state associated with the SRS resource set indicated by SRS resource set $ID_N$ field.

R: Reserved bit, set to 0.

According to the fourth embodiment, the SRS resource set indicated by the SRS resource set $ID_N$ field is associated or de-associated with the $(i+1)^{th}$ aperiodic SRS resource triggering states represented by $TN_i$ (i=0, 1, 2). $TN_i$ (i=0, 1, 2) is set to 1, which means association, or is set to 0, which means de-association.

For example, if $T1_0$, $T1_1$ and $T1_2$ are set to 1, 0, 1, the aperiodic SRS resource set indicated by the SRS resource set $ID_1$ field is associated with the first and the third aperiodic SRS resource triggering states and de-associated with the second aperiodic SRS resource triggering state.

The length of the Aperiodic SRS Resource Set Activation/Deactivation MAC CE according to the fourth embodiment is dependent on the number of SRS resource sets configured for the UE in the BWP. When the number of SRS resource sets configured for the UE in the BWP is 16, the length of the Aperiodic SRS Resource Set Activation/Deactivation MAC CE according to the fourth embodiment is 136 bits (i.e. 17 octets). When the number of SRS resource sets configured for the UE in the BWP is X (X is a positive integer), the length of the Aperiodic SRS Resource Set Activation/Deactivation MAC CE according to the fourth embodiment is X+1 octets (N indicated in FIG. 4 is equal to X).

For aperiodic SRS transmission for carrier switching scheduled by DCI format 2_3, if higher layer parameter srs-TPC-PDCCH-Group=typeA, According to the present application, the association between the configured SRS CC sets for aperiodic SRS transmission and each aperiodic SRS triggering state can be indicated or updated by a SRS CC Set Activation/Deactivation MAC CE. In addition, more than four SRS CC sets (e.g. up to eight SRS CC sets) can be configured by RRC according to the present application.

Figures 2, 5:
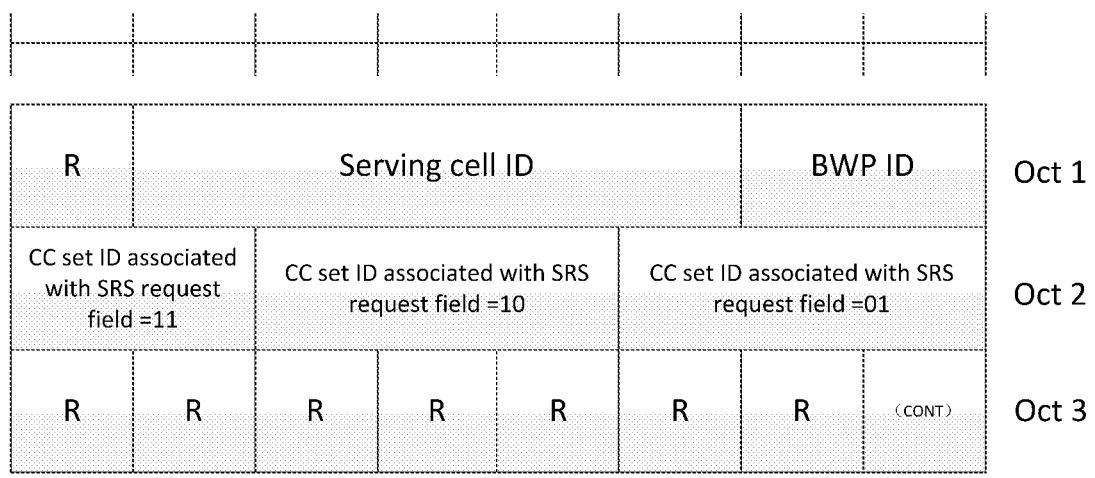

According to the fifth embodiment, for aperiodic SRS triggered by DCI format 2_3 with the higher layer parameter srs-TPC-PDCCH-Group=typeA, the gNB can send an SRS CC Set Activation/Deactivation MAC CE with the format provided in FIG. 5-1 or FIG. 5-2.

In the SRS CC Set Activation/Deactivation MAC CE shown in FIG. 5-1, four SRS CC sets are configured for the UE in a BWP. Therefore, a 2-bits field may indicate a different SRS CC set. One SRS CC set can be associated with one aperiodic SRS triggering state by the SRS CC Set Activation/Deactivation MAC CE shown in FIG. 5-1.

The SRS CC Set Activation/Deactivation MAC CE shown in FIG. 5-1 is identified by a MAC subheader with a dedicated LCID. As shown in FIG. 5-1, the SRS CC Set Activation/Deactivation MAC CE has the following fields:

Serving Cell ID: This field indicates the identity of the Serving Cell for which the MAC CE applies. The length of the field is 5 bits.

BWP ID: This field indicates a DL BWP for which the MAC CE applies as the codepoint of the DCI or UL bandwidth part indicator field as specified in TS 38.212 [9]. The length of the BWP ID field is 2 bits.

CC set ID associated with SRS request field=01 or 10 or 11: Each of these fields occupies 2 bits and indicates a SRS CC set ID that is associated with the SRS request field value being 01 or 10 or 11, respectively.

R: Reserved bit, set to 0.

According to the SRS CC Set Activation/Deactivation MAC CE shown in FIG. 5-1, only one SRS CC set can be associated with each of three aperiodic SRS triggering states. For example, if the field "CC set ID associated with SRS request field=10" is set to 11 which represents the SRS CC set #3, the SRS CC set #3 is associated with the second aperiodic SRS triggering state indicated by the SRS request field=10.

The length of the SRS CC Set Activation/Deactivation MAC CE shown in FIG. 5-1 is fixed as 16 bits (i.e. 2 octets).

In the SRS CC Set Activation/Deactivation MAC CE shown in FIG. 5-2, up to eight SRS CC sets can be configured for the UE in a BWP. Therefore, a 3-bits field may indicate a different SRS CC set among up to eight configured SRS CC sets. One SRS CC set can be associated with one aperiodic SRS triggering state by the SRS CC Set Activation/Deactivation MAC CE shown in FIG. 5-2.

The SRS CC Set Activation/Deactivation MAC CE shown in FIG. 5-2 is identified by a MAC subheader with a dedicated LCID. As shown in FIG. 5-2, the SRS CC Set Activation/Deactivation MAC CE has the following fields:

Serving Cell ID: This field indicates the identity of the Serving Cell for which the MAC CE applies. The length of the field is 5 bits.

BWP ID: This field indicates a DL BWP for which the MAC CE applies as the codepoint of the DCI or UL bandwidth part indicator field as specified in TS 38.212 [9]. The length of the BWP ID field is 2 bits.

CC set ID associated with SRS request field=01 or 10 or 11: Each of these fields occupies 3 bits and indicates a SRS CC set ID that is associated with the SRS request field value being 01 or 10 or 11, respectively. Incidentally, in FIG. 5-2, the first (the most to the right) bit of Oct 3 (shown as "(CONT)") is a part of "CC set ID associated with SRS request field=11".

R: Reserved bit, set to 0.

According to the SRS CC Set Activation/Deactivation MAC CE shown in FIG. 5-2, only one SRS CC set can be associated with each of three aperiodic SRS triggering states. For example, if the field "CC set ID associated with SRS request field=10" is set to 101 which represents the SRS CC set #5, the SRS CC set #5 is associated with the second aperiodic SRS triggering state indicated by the SRS request field=10.

The length of the SRS CC Set Activation/Deactivation MAC CE shown in FIG. 5-2 is fixed as 24 bits (i.e. 3 octets).

According to the fifth embodiment, each of the configured SRS CC sets can be associated with one of the aperiodic SRS triggering states. The number of the configured SRS CC sets may be more than 4. Although the SRS CC Set Activation/Deactivation MAC CE shown in FIGS. 5-1 and 5-2 can support up to 4 and up to 8 configured SRS CC sets, it is apparent that more configured SRS CC sets can be supported if each of CC set ID associated with SRS request field=01 or 10 or 11 occupies more bits.

According to the sixth embodiment, for aperiodic SRS triggered by DCI format 2_3 with the higher layer parameter srs-TPC-PDCCH-Group=typeA, the gNB can send an SRS CC Set Activation/Deactivation MAC CE with the format provided in FIG. 6. Up to eight SRS CC sets can be configured for the UE in a BWP.

The SRS CC Set Activation/Deactivation MAC CE according to the sixth embodiment is identified by a MAC subheader with a dedicated LCID. As shown in FIG. 6, the SRS CC Set Activation/Deactivation MAC CE according to the six embodiment has the following fields:

Serving Cell ID: This field indicates the identity of the Serving Cell for which the MAC CE applies. The length of the field is 5 bits.

BWP ID: This field indicates a DL BWP for which the MAC CE applies as the codepoint of the DCI or UL bandwidth part indicator field as specified in TS 38.212 [9]. The length of the BWP ID field is 2 bits.

$SN_i$: this field indicates the activation or deactivation status of the SRS CC set with cc-SetIndex i associated with the $N^{th}$ aperiodic SRS resource triggering state (N=1 or 2 or 3). The $SN_i$ field is set to 1 to indicate that the SRS CC set with cc-SetIndex i shall be associated with the $N^{th}$ aperiodic SRS resource triggering state. The $SN_i$ field is set to 0 to indicate that the SRS CC set with cc-SetIndex i shall be de-associated with the $N^{th}$ aperiodic SRS resource triggering state.

R: Reserved bit, set to 0.

According to the sixth embodiment, the $N^{th}$ aperiodic SRS resource triggering state (N=1 or 2 or 3) is associated with each of SRS CC sets represented by $SN_i$ field that is set to 1, and de-associated with each of SRS CC sets represented by $SN_i$ field that is set to 0.

For example, $SN_0$ to $SN_7$ represent 8 SRS CC sets (N=1 or 2 or 3), respectively. If $SN_i$ is set to 1 (N=1 or 2 or 3; i is any of 0 to 7), the $(i+1)^{th}$ SRS CC set represented by $SN_i$ is associated with the $N^{th}$ aperiodic SRS resource triggering state. On the other hand, if $SN_i$ is set to 0 (N=1 or 2 or 3; i is any of 0 to 7), the $(i+1)^{th}$ SRS CC set represented by $SN_i$ is de-associated with the $N^{th}$ aperiodic SRS resource triggering state.

The length of the Aperiodic SRS Resource Set Activation/Deactivation MAC CE according to the sixth embodiment is dependent on the number of SRS CC sets configured for the UE in the BWP, and is fixed as 32 bits (i.e. 4 octets) when the number of SRS CC sets configured for the UE in the BWP is 8.

Although the SRS CC Set Activation/Deactivation MAC CE shown in FIG. 6 can support up to 8 configured SRS CC sets, it is apparent that more configured SRS CC sets can be supported if more $SN_i$ (i is more than 8) fields are contained.

For multi-DCI based multi-TRP operation, up to 5 CORESETs can be configured for a UE in a BWP for PDCCH transmission and each CORESET can be configured with a higher layer parameter CORESETPoolIndex. In FR2, the same SRS request value transmitted by different DCIs transmitted from different TRPs should be associated with different SRS resources or different SRS resource sets. So, the above-described MAC CE for DCI format 0_1 or 1_1 or 2_3 should be associated with a higher layer parameter CORESETPoolIndex if it is configured for at least one CORESET in one BWP for one UE. The SRS request field in the DCI can only trigger the aperiodic SRS resource(s) activated by the MAC CE associated with the higher layer parameter CORESETPoolIndex configured for the CORESET transmitting the DCI.

The association between the higher layer parameter CORESETPoolIndex and the MAC CE according to the first to the sixth embodiments can be implemented by containing an associatedCORESETPoolIndex field with 1 bit in the MAC CE according to the first to the sixth embodiments.

FIG. 7 illustrates an example of the SRS CC Set Activation/Deactivation MAC CE according to the seventh embodiment. The example of the Aperiodic SRS Resource Set Activation/Deactivation MAC CE according to the seventh embodiment differs from the SRS CC Set Activation/Deactivation MAC CE according to the sixth embodiment only in that an extra associatedCORESETPoolIndex field (i.e. C field in FIG. 7) is added (to replace the Reserved bit in FIG. 6).

FIG. 8 illustrates an example of the Aperiodic SRS Resource Set Activation/Deactivation MAC CE according to the seventh embodiment. The example of the Aperiodic SRS Resource Set Activation/Deactivation MAC CE according to the seventh embodiment differs from the Aperiodic SRS Resource Set Activation/Deactivation MAC CE according to the first embodiment only in that an extra associatedCORESETPoolIndex field (i.e. C field in FIG. 8) is added (to replace one of the Reserved bits in FIG. 1).

Figure 9:
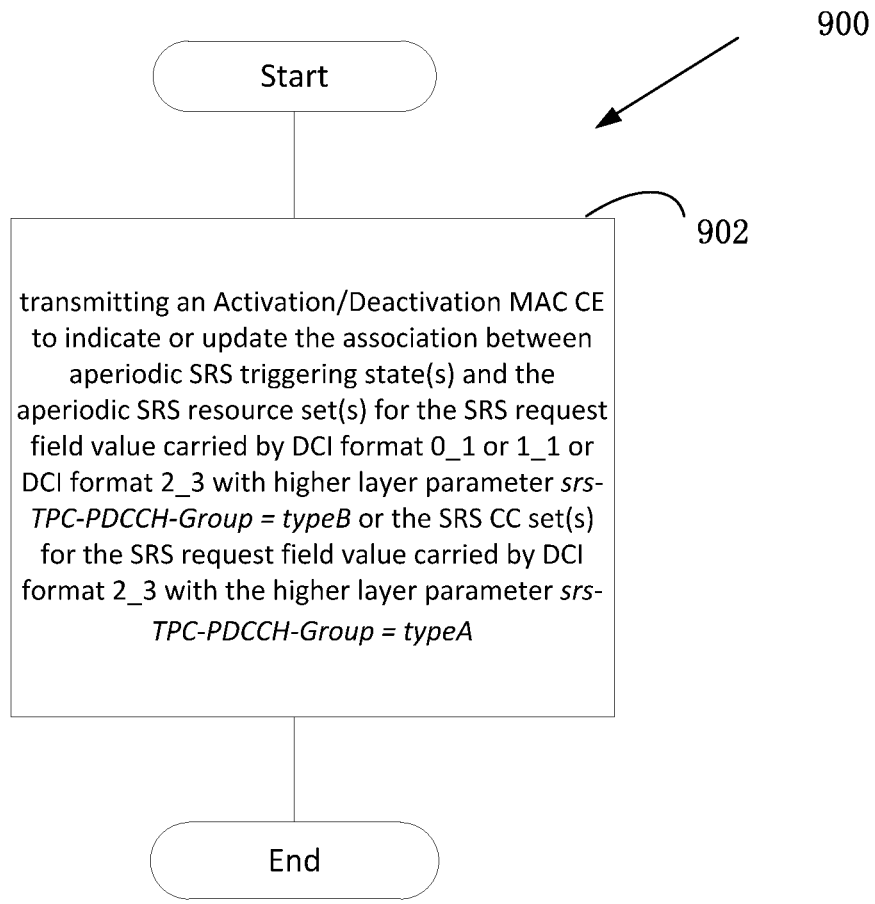
FIG. 9 is a schematic flow chart diagram illustrating an embodiment of a method.

FIG. 9 is a schematic flow chart diagram illustrating an embodiment of a method 900 according to the present application. In some embodiments, the method 900 is performed by an apparatus, such as a base unit. In certain embodiments, the method 900 may be performed by a processor executing program code, for example, a microcontroller, a microprocessor, a CPU, a GPU, an auxiliary processing unit, a FPGA, or the like.

The method 900 may include 902 transmitting an Activation/Deactivation MAC CE to indicate or update the association between aperiodic SRS triggering state(s) and the aperiodic SRS resource set(s) for the SRS request field value carried by DCI format 0_1 or 1_1 or DCI format 2_3 with higher layer parameter srs-TPC-PDCCH-Group=typeB or the SRS CC set(s) for the SRS request field value carried by DCI format 2_3 with the higher layer parameter srs-TPC-PDCCH-Group=typeA.

Figure 10:
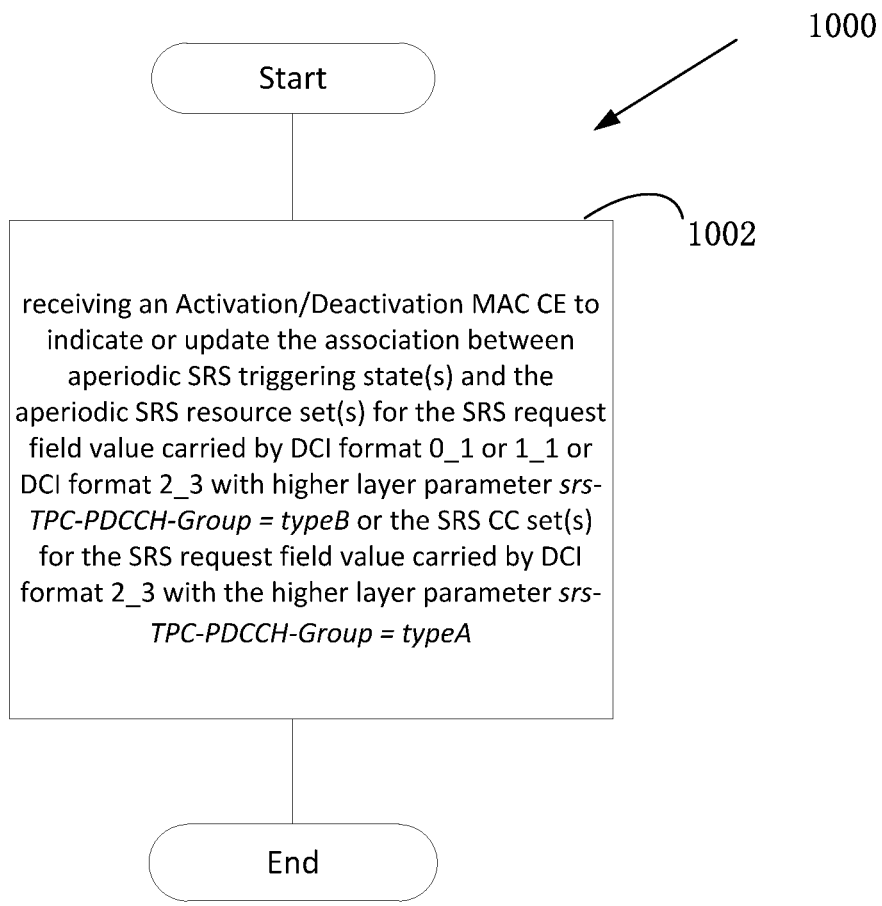
FIG. 10 is a schematic flow chart diagram illustrating a further embodiment of a method.

FIG. 10 is a schematic flow chart diagram illustrating a further embodiment of a method 1000 according to the present application. In some embodiments, the method 1000 is performed by an apparatus, such as a remote unit. In certain embodiments, the method 1000 may be performed by a processor executing program code, for example, a microcontroller, a microprocessor, a CPU, a GPU, an auxiliary processing unit, a FPGA, or the like.

The method 1000 may include 1002 receiving an Activation/Deactivation MAC CE to indicate or update the association between aperiodic SRS triggering state(s) and the aperiodic SRS resource set(s) for the SRS request field value carried by DCI format 0_1 or 1_1 or DCI format 2_3 with higher layer parameter srs-TPC-PDCCH-Group=typeB or the SRS CC set(s) for the SRS request field value carried by DCI format 2_3 with the higher layer parameter srs-TPC-PDCCH-Group=typeA.

Figure 11:
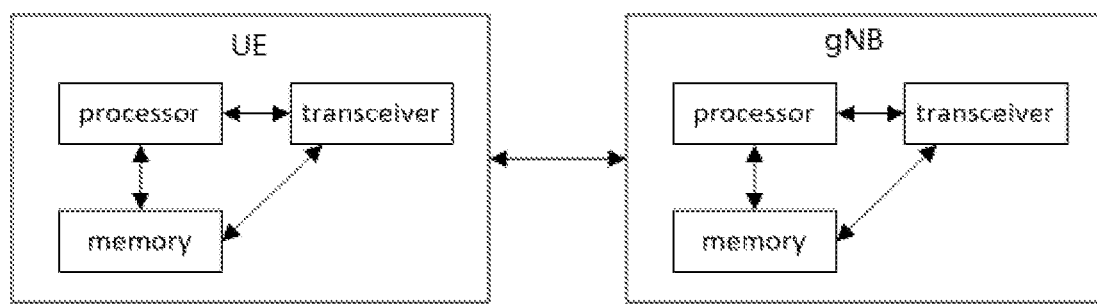
FIG. 11 is a schematic block diagram illustrating apparatuses according to one embodiment.

FIG. 11 is a schematic block diagram illustrating apparatuses according to one embodiment.

Referring to FIG. 11, the UE (i.e. the remote unit) includes a processor, a memory, and a transceiver. The processor implements a function, a process, and/or a method which are proposed in FIG. 10. The gNB (i.e. base unit) includes a processor, a memory, and a transceiver. The processors implement a function, a process, and/or a method which are proposed in FIG. 9. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
receiving radio resource control (RRC) signaling that indicates a first plurality of sounding reference signal (SRS) component carrier (CC) sets;
receiving, after the RRC signaling, a medium access control control element (MAC CE) comprising a control resource set (CORESET) pool index parameter and an SRS transmit power control (TPC) grouping type parameter that indicates a second plurality of SRS CC sets, wherein the second plurality of SRS CC sets correspond to respective SRS request field values carried by downlink control information (DCI), and wherein the second plurality of SRS CC sets comprises an update to the first plurality of SRS CC sets;
receiving the DCI comprising an SRS request field value of the respective SRS request field values; and
transmitting, using an SRS CC set of the second plurality of SRS CC sets corresponding to the SRS request field value, one or more aperiodic SRSs based at least in part on the DCI being associated with a CORSET with a same value of the CORESET pool index parameter as the MAC CE.

2. The method of claim 1, wherein the MAC CE updates an association between one or more aperiodic SRS triggering states and one or more aperiodic SRS resource sets for the SRS request field value, and wherein the DCI is a DCI format 0_1 or 1_1 or a DCI format 2_3 with a higher layer parameter srs-TPC-PDCCH-Group=typeB.

3. A user equipment (UE) for wireless communication, comprising:
   at least one memory; and
   at least one processor coupled with the at least one memory and configured to cause the UE to:
      receive radio resource control (RRC) signaling that indicates a first plurality of sounding reference signal (SRS) component carrier (CC) sets;
      receive, after the RRC signaling, a medium access control control element (MAC CE) comprising a control resource set (CORESET) pool index parameter and an SRS transmit power control (TPC) grouping type parameter that indicates a second plurality of SRS CC sets, wherein the second plurality of SRS CC sets correspond to respective SRS request field values carried by downlink control information (DCI), and wherein the second plurality of SRS CC sets comprises an update to the first plurality of SRS CC sets;
      receive the DCI comprising an SRS request field value of the respective SRS request field values; and
      transmit, using an SRS CC set of the second plurality of SRS CC sets corresponding to the SRS request field value, one or more aperiodic SRSs based at least in part on the DCI being associated with a CORSET with a same value of the CORESET pool index parameter as the MAC CE.

4. The UE of claim 3, wherein the MAC CE updates an association between one or more aperiodic SRS triggering states and one or more aperiodic SRS resource sets for the SRS request field value, and wherein the DCI is a DCI format 0_1 or 1_1 or a DCI format 2_3 with a higher layer parameter srs-TPC-PDCCH-Group=typeB.

5. The UE of claim 4, wherein the MAC CE indicates the one or more aperiodic SRS triggering states and the one or more aperiodic SRS resource sets.

6. The UE of claim 4, wherein the MAC CE comprises one or more aperiodic SRS triggering state identifier fields to indicate the MAC CE applies to the one or more aperiodic SRS triggering states.

7. The UE of claim 4, wherein respective activation statuses of the one or more aperiodic SRS resource sets associated with the one or more aperiodic SRS triggering states are indicated by a bitmap.

8. The UE of claim 4, wherein the MAC CE comprises one or more aperiodic SRS resource set identifier fields to indicate the MAC CE applies to the one or more aperiodic SRS resource sets.

9. The UE of claim 8, wherein the one or more aperiodic SRS triggering states for a respective aperiodic SRS resource set of the one or more aperiodic SRS resource sets are indicated by a 3-bits bitmap, and wherein respective bits of the 3-bits bitmap indicate activate statuses of the one or more aperiodic SRS triggering states for the respective aperiodic SRS resource set indicated by the one or more aperiodic SRS resource set identifier fields.

10. The UE of claim 3, wherein the MAC CE comprises a bandwidth part (BWP) identifier field that indicates a BWP associated with the MAC CE and one or more CC set identifier fields that update an association between one or more aperiodic SRS triggering states and the second plurality of SRS CC sets for the SRS request field value, and wherein the DCI is a DCI format 2_3 with a higher layer parameter srs-TPC-PDCCH-Group=typeA.

11. The UE of claim 3, wherein the RRC signaling indicates more than four SRS CC sets according to capability of the UE.

12. The UE of claim 3, wherein the MAC CE comprises one or more SRS CC set identifier fields to indicate respective activated SRS CC sets of the second plurality of SRS CC sets for one or more aperiodic SRS triggering states.

13. The UE of claim 3, wherein activation statuses of respective SRS CC sets of the second plurality of SRS CC sets for one or more aperiodic SRS triggering states are listed as a bitmap, and wherein the second plurality of SRS CC sets are activated for an aperiodic SRS triggering state of the one or more aperiodic SRS triggering states.

14. A base unit for wireless communication, comprising:
   at least one memory; and
   at least one processor coupled with the at least one memory and configured to cause the base unit to:
      transmit radio resource control (RRC) signaling that indicates a first plurality of sounding reference signal (SRS) component carrier (CC) sets;
      transmit, after the RRC signaling, a medium access control control element (MAC CE) comprising a control resource set (CORESET) pool index parameter and an SRS transmit power control (TPC) grouping type parameter that indicates a second plurality of SRS CC sets, wherein the second plurality of SRS CC sets correspond to respective SRS request field values carried by downlink control information (DCI), and wherein the second plurality of SRS CC sets comprises an update to the first plurality of SRS CC sets;
      transmit the DCI comprising an SRS request field value of the respective SRS request field values; and
      receive, using an SRS CC set of the second plurality of SRS CC sets corresponding to the SRS request field value, one or more aperiodic SRSs based at least in part on the DCI being associated with a CORSET with a same value of the CORESET pool index parameter as the MAC CE.

15. The base unit of claim 14, wherein the MAC CE updates an association between one or more aperiodic SRS triggering states and one or more aperiodic SRS resource sets for the SRS request field value, and wherein the DCI is a DCI format 0_1 or 1_1 or a DCI format 2_3 with a higher layer parameter srs-TPC-PDCCH-Group=typeB.

16. The base unit of claim 15, wherein the MAC CE indicates the one or more aperiodic SRS triggering states and the one or more aperiodic SRS resource sets.

17. The base unit of claim 15, wherein the MAC CE comprises one or more aperiodic SRS triggering state identifier fields to indicate the MAC CE applies to the one or more aperiodic SRS triggering states.

18. The base unit of claim 17, wherein respective activation statuses of the one or more aperiodic SRS resource sets associated with the one or more aperiodic SRS triggering states are indicated by a bitmap.

19. The base unit of claim 15, wherein the MAC CE comprises one or more aperiodic SRS resource set identifier fields to indicate the MAC CE applies to the one or more aperiodic SRS resource sets.

20. A method performed by a base unit, the method comprising:
- transmitting radio resource control (RRC) signaling that indicates a first plurality of sounding reference signal (SRS) component carrier (CC) sets;
- transmitting a medium access control control element (MAC CE) comprising a control resource set (CORESET) pool index parameter and an SRS transmit power control (TPC) grouping type parameter that indicates a second plurality of SRS CC sets, wherein the second plurality of SRS CC sets correspond to respective SRS request field values carried by downlink control information (DCI), and wherein the second plurality of SRS CC sets comprises an update to the first plurality of SRS CC sets;
- transmitting the DCI comprising an SRS request field value of the respective SRS request field values; and
- receiving, using an SRS CC set of the second plurality of SRS CC sets corresponding to the SRS request field value, one or more aperiodic SRSs based at least in part on the DCI being associated with a CORSET with a same value of the CORESET pool index parameter as the MAC CE.

\* \* \* \* \*